(12) United States Patent
Wermer et al.

(10) Patent No.: US 6,378,913 B1
(45) Date of Patent: Apr. 30, 2002

(54) SWIVEL COUPLING AND METHOD FOR ATTACHING A SWIVEL NUT TO A TAIL PIECE

(75) Inventors: Richard I. Wermer, Hicksville; Leo Beagle, Payne, both of OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/431,209

(22) Filed: Nov. 1, 1999

(51) Int. Cl.⁷ ................................................ F16L 33/20
(52) U.S. Cl. ...................................................... 285/256
(58) Field of Search .................. 385/382, 256, 385/280

(56) References Cited

U.S. PATENT DOCUMENTS

| | | | |
|---|---|---|---|
| 1,135,727 A | | 4/1915 | Schmidt |
| 2,323,912 A | | 7/1943 | Johnson |
| 2,324,338 A | | 7/1943 | Healy |
| 2,525,616 A | * | 10/1950 | Peeps ...................... 285/256 X |
| 2,926,029 A | * | 2/1960 | Clair et al. .................. 285/256 |
| 3,521,912 A | | 7/1970 | Maurer |
| 3,530,900 A | * | 9/1970 | Kish ........................... 385/256 |
| 3,951,438 A | * | 4/1976 | Scales .................... 285/256 X |
| 4,135,288 A | * | 1/1979 | Pitschi .................... 285/256 X |
| 4,366,841 A | * | 1/1983 | Currie et al. ............ 285/256 X |
| 4,671,542 A | | 6/1987 | Juchnowski | 
| 4,684,157 A | * | 8/1987 | Smith ......................... 385/256 |

FOREIGN PATENT DOCUMENTS

JP           1-206192        *  8/1989    ............. 285/256 X

* cited by examiner

Primary Examiner—Lynne H. Browne
Assistant Examiner—David E. Bochna
(74) Attorney, Agent, or Firm—Millen, White, Zelano & Branigan, P.C.

(57) ABSTRACT

A swivel coupling used to connect metal tubes to externally threaded fittings in hydraulic systems includes a swivel nut which is attached to a tail piece by deforming a collar portion of the swivel nut into a locking relationship with the tail piece. This is accomplished by having facing and aligned shoulders on the swivel nut and on the tail piece which prevent the swivel nut from axially disengaging from the tail piece when the swivel nut is rotated to thread onto the threaded fitting. The tail piece has a flat end face which engages a flat end face on the fitting so that a leak-proof joint is formed between the tube and the fitting. The nut includes a frusto-conical portion that is engaged by a frusto-conical die surface on a split die ring in order to cam the collar portion toward the tail piece and align the respective shoulders thereof.

9 Claims, 4 Drawing Sheets

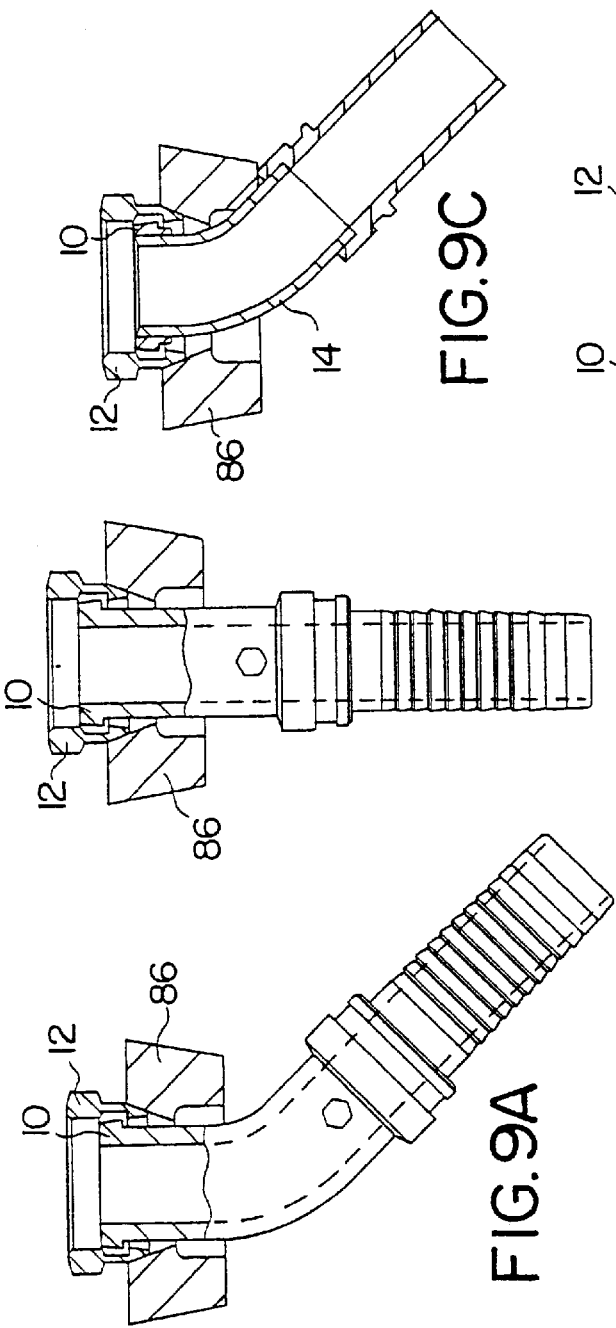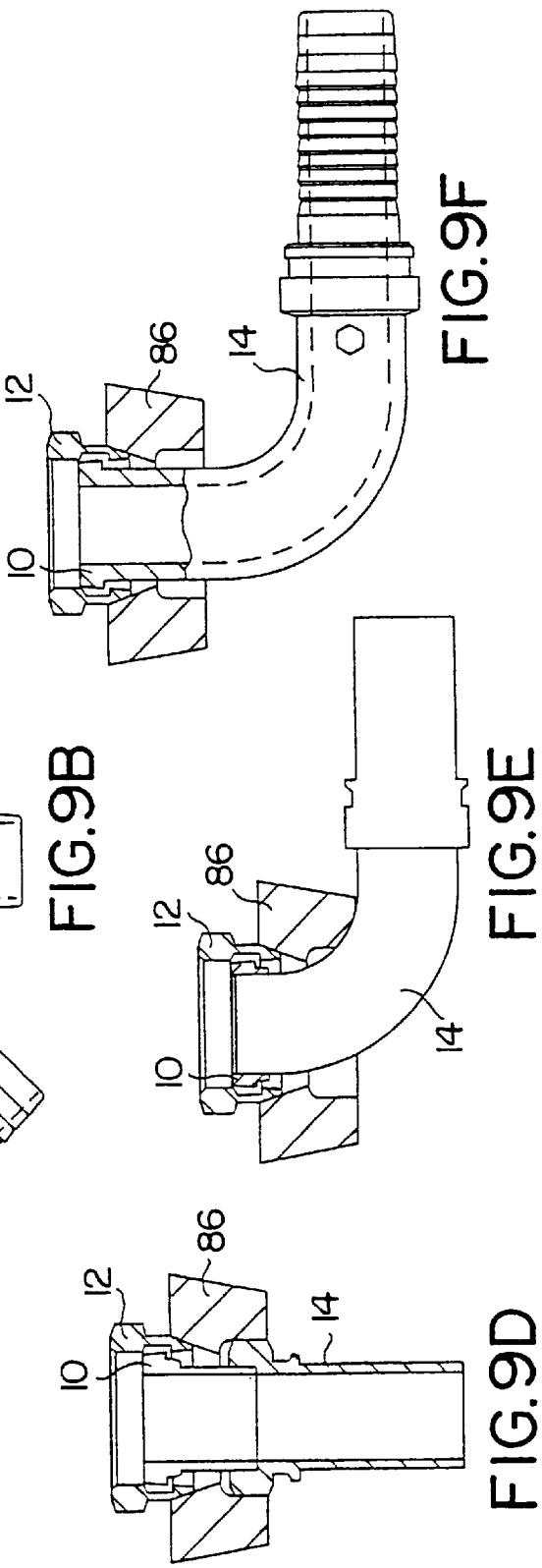

SWIVEL COUPLING AND METHOD FOR ATTACHING A SWIVEL NUT TO A TAIL PIECE

FIELD OF THE INVENTION

The present invention relates to a swivel coupling and to a method of joining a swivel nut to a tail piece. More particularly, the present invention is directed to a swivel coupling including a swivel nut and tail piece of a tube and to a method of joining the swivel nut to the tail piece by deformation of a portion of the swivel nut.

BACKGROUND OF THE INVENTION

There is a need to improve the reliability of swivel couplings used to couple high pressure hydraulic lines configured as tubes to fittings on devices such as hydraulic pumps and controls or other tubes. In the past, brazing has been used to make the connection between a tail end and associated hydraulic device, however, brazing can cause rippling in the bearing surface which can result in leakage.

In order to have a viable tight connection, it is preferable to have a flat face connection in which the tail piece has a flat end face which is directly abutted by the flat end face of the fitting of the device, with soft sealing being in a radial direction. Achieving a stable leak-proof interface between the abutting end faces has in the past been both expensive and difficult.

Normally, when using a swivel nut there are machining draft angles on mating surfaces which interferes with parallelism so that mating parts are not flush when they abut. This can result in leaks and bending moments during assembly that are detrimental to product performance. Normal crimping methods for attaching a swivel nut to a tail piece often results in non-uniform distortion and stress around the circumference, as well as localized high stress and deformations at locations between the individual crimping fingers of the segments. Consequently, coupling are unreliable with leakage tending to occur at high pressures.

SUMMARY OF THE INVENTION

In view of the aforementioned considerations, it is a feature of the present invention to provide a new and improved swivel coupling for joining a tube or a similar element to a fitting.

In view of this feature and other features, the present invention is directed to a coupling for joining an end of a tube to a threaded fitting, wherein the tail piece on the end of the tube has an end face and an outwardly extending radial shoulder spaced from the end face for coupling to a swivel nut. The swivel nut has a threaded portion and a collar portion formed about an axis. The collar portion extends from one end of the threaded portion and has a radial thickness less than the threaded portion. The collar portion also includes an end and an inwardly projecting radial shoulder spaced from that end, which inwardly projecting shoulder faces the outwardly projecting shoulder of the tail piece. In order to facilitate deforming the collar portion about the tail piece, the collar portion is inclined at an acute angle with respect to the longitudinal axis of the coupling.

A method for making the coupling formed about an axis for joining a swivel nut to a tail piece comprises providing the swivel nut with a threaded portion, from which threaded portion extends a radially deformable collar having an inwardly extending radial shoulder disposed adjacent an exterior frusto-conical surface inclined at an acute angle with respect to the axis of the coupling. The tail piece is provided with an outwardly extending radial shoulder to be abutted by the inwardly extending radial shoulder of the deformable collar. In accordance with the method, the swivel nut is slid over the tail piece with the inwardly extending shoulder of the swivel nut spaced from and facing the outwardly extending shoulder of the tail piece. The swivel nut is joined to the tail piece by pushing the swivel nut in an axial direction back against an inclined surface. Simultaneously, the tail piece is pushed in the same axial direction to cam the collar radially inward toward the tail piece. This places the inwardly projecting, radial shoulder on the collar into alignment with the outwardly projecting radial shoulder on the tail piece with an annular gap therebetween.

In both the swivel coupling and the method, the frusto-conical surface is inclined at an angle in the range of about 20 to about 30° with respect to the axis of the coupling with the angle preferably being about 20°. In the method, the inclined surface against which the collar portion of the swivel nut is pushed is preferably inclined at the same angle as the frusto-conical surface defining the exterior surface of the deformable collar.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein:

FIGS. 9a–9f are side views, partially in elevation, showing swivel nuts being attached to end pieces and metal tubes of various configurations.

DETAILED DESCRIPTION

Figure 1:
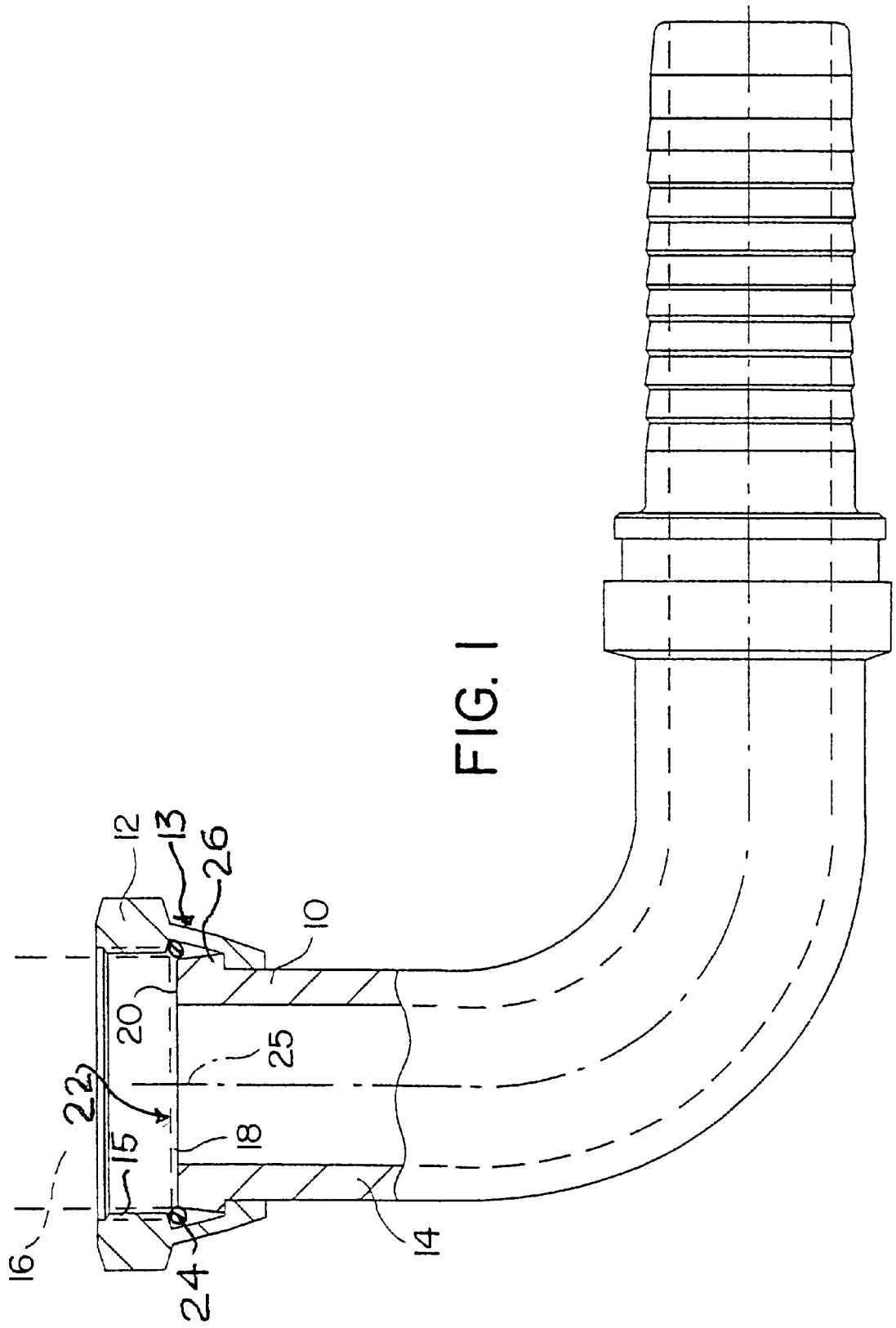
FIG. 1 is an enlarged side view, partially in elevation, showing a swivel nut attached to a tail piece to provide a swivel coupling in accordance with the present invention.

Referring now to FIG. 1, there is shown a tail piece 10 having a swivel nut 12 mounted thereon to form a swivel coupling 13. The tail piece 10 is either attached to or unitary with the end of a metal tube 14 and the swivel nut 12 has a threaded interior surface 15 for threadably engaging a projection 16 from a hydraulic device such as, but not limited to, a hydraulic cylinder, a hydraulic controller, a hydraulic pump or a hydraulic motor. The projection 16 has an end face 18 which fits flush against an end face 20 of the tail piece 10. A seal is formed at the interface 22 defined by the abutment of the end faces 18 and 20. An O-ring 24 provides a radial seal to help prevent leakage of any fluid which might pass through the interface 22.

Figure 2:
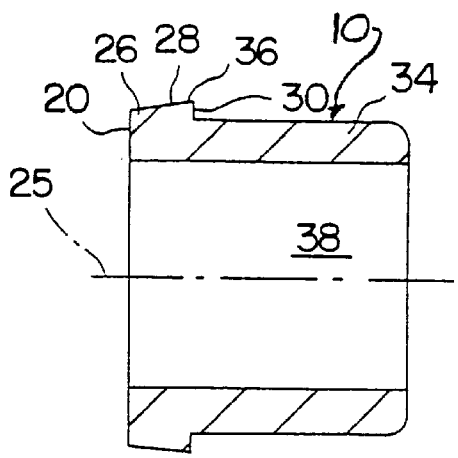
FIG. 2 is a side elevation of a tail piece which forms the end of a tube.
Figure 3:
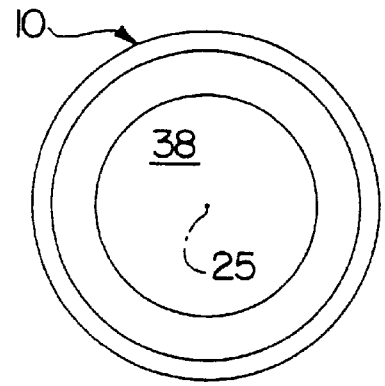
FIG. 3 is an end view of the tail piece of FIG. 2.

As is seen in FIGS. 2 and 3, the end face 20 extends normally or perpendicular with respect to the axis 25 of the tail piece 10 and also forms a front surface of a lip 26 which projects radially from the tail piece. The lip 26 is frusto-conical in shape and has a frusto-conical outer surface 28. The frusto-conical outer surface 28 is joined by a radially extending shoulder 30 to a cylindrical outer surface 32 of the tail piece 10. Preferably, the frusto-conical lip 28 has a portion 36 thereon, which extends in the direction of the axis 25 so as to form a flat portion which is not frusto-conical. The tail piece 10 has a bore 38 which is cylindrical as it extends back from the end face 20.

Figure 4:
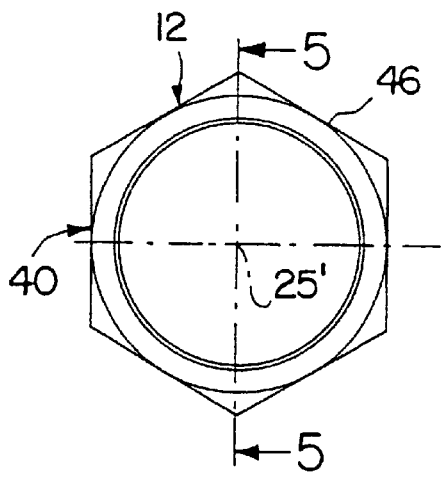
FIG. 4 is an end view of a swivel nut shown in FIG. 1.
Figure 5:
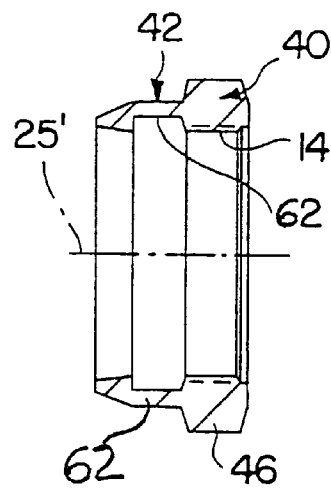
FIG. 5 is a side elevation of the swivel nut of FIG. 4 taken along lines 5—5 of FIG. 4.
Figure 6:
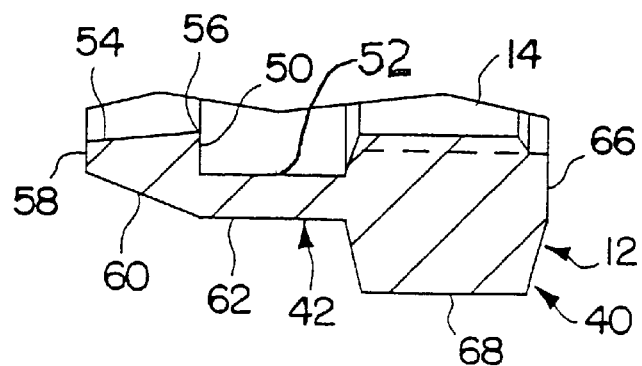
FIG. 6 is an enlarged view of a portion of the swivel nut of FIG. 5 showing details thereof.

Referring now to FIGS. 4, 5 and 6 where the swivel nut 12 is shown in detail, it is seen that the swivel nut consists of a threaded portion 40 and a collar portion 42. The threaded portion 40 has an exterior surface 44 comprised of flats 46 which enable a tool, such as a wrench, to grip the swivel nut 12. Preferably, the exterior surface 44 forms a hex nut with the surfaces 46. The interior surface of the threaded portion 42 has the helical thread 14 therein for threadably engaging with the exterior surface of the exteriorly threaded fitting 16. (See FIG. 1.)

The collar portion 42 extends from the threaded portion 40 and has a shoulder 50 which is spaced from the threaded portion by a gap 52. The shoulder 50 is canted about 2° from the perpendicular with respect to the axis 25' of the swivel nut 12 which corresponds with the axis 25 of the tail piece 10. The shoulder 50 joins a frusto-conical surface 54 which slopes away from an edge 56 at a 5° angle and terminates in an end surface 58. The end surface 58 is joined by a frusto-conical portion 60 which is inclined in a range of 10–30° with respect to the axis 25' and preferably at about 20° with respect to that axis. The frusto-conical portion 60 is joined by cylindrical portion 62 to form the collar portion 42 which is unitary with the threaded portion 40.

Figure 8:
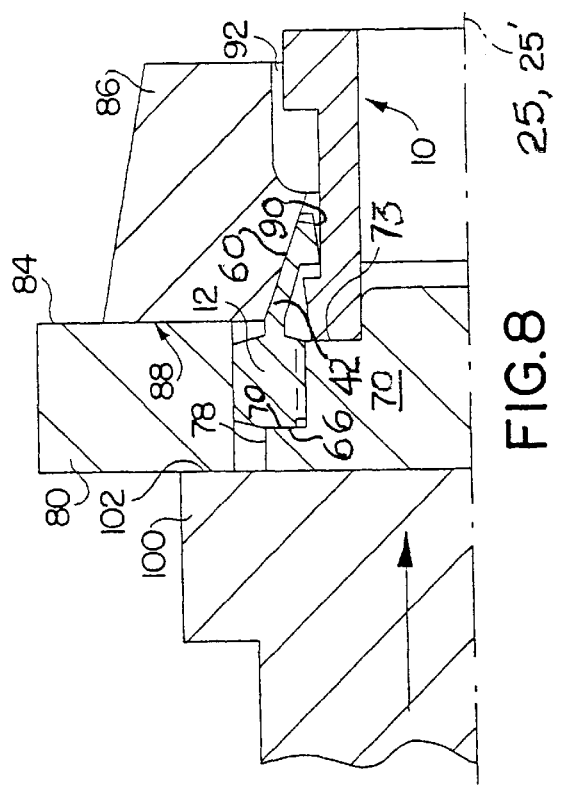
FIG. 8 is a side view similar to FIG. 7, but showing the swivel nut attached to the tail piece after deformation.
Figure 7:
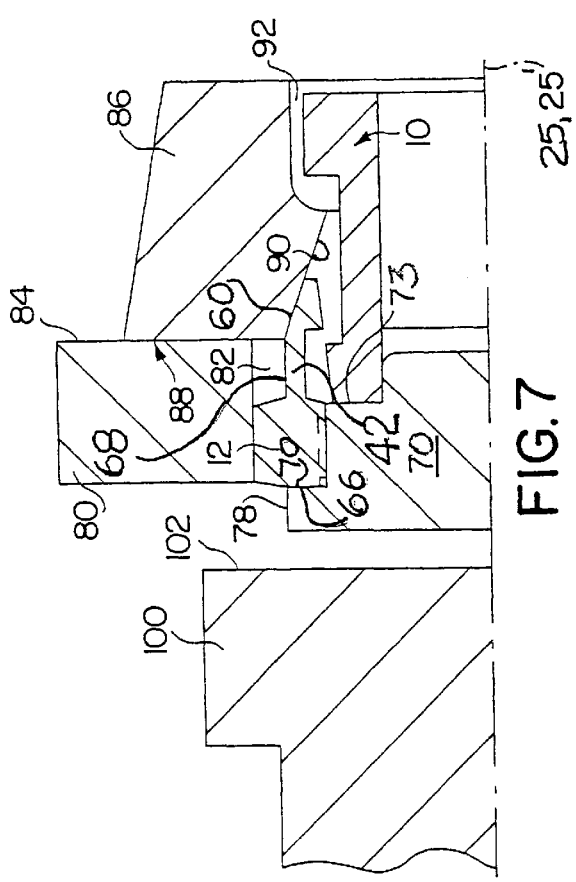
FIG. 7 is a side view partially in elevation of a tail piece and swivel nut prior to deformation of a portion of the swivel nut to form the swivel coupling of FIG. 1.

As is seen in FIGS. 7 and 8, the swivel nut 12 has an end face 66 which extends perpendicular to the axes 25 and 25', a cylindrical surface 68 which extends parallel to the axes, and the surfaces portion 62. These faces and surfaces cooperate when deforming the collar portion 42 to attach the swivel nut 12 on the tail piece 10 when the shoulder 50 of the swivel nut faces and aligns with the shoulder 30 of the tail piece.

As is seen in FIG. 7, the end face 66 of the swivel nut 12 is engaged by a shoulder 70 of a mandrel 72, while the end face 20 of the tail piece 12 is engaged by an inner shoulder 73 of the mandrel. The mandrel 72 is received within the internal thread 14 of the swivel nut 12 so as to axially position the swivel nut 12 and tail piece 10. The swivel nut 12 is then surrounded by a stop ring 80 which engages the cylindrical exterior surface 68 of the swivel nut 12 with a smooth cylindrical surface 82. The mandrel 72 has a flange 76 thereon, which has a diameter less than that of the cylindrical surface 82 and an axial length 78 which determines how far the mandrel can be pushed through the stop ring 80.

The stop ring 80 has a first surface 84 which abuts a split die ring 86 at a flat face 88 of the split dye ring. The split dye ring 86 also has a frusto-conical camming surface 90 which is disposed at an angle in the range of 10 to 30° with respect to the axes 25 and 25' and preferably at an angle of about 20° with respect to the axes. The frusto-conical surface 90 engages the frusto-conical surface 60 of the collar portion 42 of swivel 10 which has an angle of inclination preferably the same as that of the frusto-conical surface 90. In other words, if the frusto-conical surface 90 is 20°, then the angle of the frusto-conical surface 60 is the same, i.e., 20°, with respect to the axes 25 and 25'. Behind the frusto-conical portion 90, there is a cylindrical section 92 for accommodating any increases in width of the tail piece 10. The split die ring 86 is split into two halves so that it can be applied radially about the tail piece 10 and swivel nut 12. The split die ring 86 is then clamped around the tail piece 10 with the frusto-conical surface 60 on the conical portion 42 of the swivel nut 12 engaged by the frusto-conical surface 90.

Referring now to FIGS. 8a–8g, there is shown several arrangements for attaching swivel nut 12 to a tail piece 10 in which the tube 11 is either curved (FIGS. 8a,c,e and f) or straight (FIGS. 8b and d). In each case, the split die ring 86 is applied and removed laterally from around the fitting assembly of the swivel nut 12 and tail piece 10.

In order to effect the permanent swivel attachment of the swivel nut 12 to the tail piece 10, a pusher 100 having a face 102 is pressed against the flange 78 so as to push the mandrel 72 from the position shown in FIG. 7 to the position shown in FIG. 8. The surface 102 of the pusher abuts the stop ring 80 while the thickness of the flange 78 determines the axial extent to which the swivel nut 12 is moved with respect to the tail piece 10. During this pushing step, the frusto-conical surface 90 of the split die 86 applies a radial force to the frusto-conical surface 60 of the collar 42 of swivel nut 12 which cams the collar toward the tail piece by a selected distance so that the shoulder 50 on the swivel nut 12 is facing and in alignment with the shoulder 30 on the tail piece 10 with a gap 104 therebetween. After the assembly of the swivel coupling 13 is accomplished, the split die ring 86 is separated into its two halves 86a and 86b so that it can be laterally separated from the tail piece 10 and swivel nut 12. The stop ring 84 and mandrel 74 are then slid axially away from the assembly leaving the arrangement as shown in FIG. 1.

By utilizing the aforedescribed attachment method in combination with the aforedescribed swivel nut 10 and tail piece 12, the reliability of the swivel coupling between the swivel nut and tail piece is increased because the bearing surfaces are more uniform than conventional attachment methods such as crimping. Moreover, the method compensates for natural machining draft angles of the swivel nut 12 and mating insert 16 which improves the bearing surfaces and permits parallelism. The method restrains bending moment during the assembly steps of FIGS. 7 and 8, which bending moments can be detrimental to the couplings' performance because these moments weaken the coupling.

FIGS. 9a–9f show the swivel nut 12 being coupled with end pieces 10 of various configurations, the end pieces of FIGS. 9c, 9d and 9e being separate from the tubes 14 and the end pieces of FIGS. 9a, 9b and 9f being unitary with the tubes.

From the foregoing description, one skilled in the art can easily ascertain the essential characteristics of this invention and, without departing from the spirit and scope thereof, can make various changes and modifications of the invention to adapt it to various usages and conditions.

Upon further study of the specification and appended claims, further objects and advantages of this invention will become apparent to those skilled in the art.

What is claimed is:

1. A coupling joining an end of a tube to a threaded element comprising:
   a tail piece unitary or integral with the tube, the tailpiece having, an end face and an outwardly projecting radial shoulder spaced from the end face;

a swivel nut having a threaded portion and a collar portion formed about a longitudinal axis, the collar portion extending from one end of the threaded portion and having a radial thickness less than that of the threaded portion, the collar portion having an end and having an inwardly projecting radial shoulder spaced from the end which, inwardly projecting radial shoulder faces the outwardly projecting radial shoulder of the tail piece with the collar portion having an initial frusto-conical portion having an outer surface initially inclined at an acute angle in the range of about 10° to about 30° with respect to the longitudinal axis, and the collar portion further having an initial cylindrical portion initially having surfaces extending parallel with the longitudinal axis, the initial cylindrical portion being deformed into a final frusto-conical configuration upon an axial force being applied to the outer surface of the initial frusto-conical portion to urge the inwardly projecting radial shoulder into facing alignment with the outwardly projecting radial shoulder of the tail piece, whereby stress and distortion in the final frusto-conical portion due to deformation thereof is minimized.

2. The coupling of claim 1 wherein the threaded portion of the swivel nut is internally threaded and wherein the distance between the end face of the tail piece and the externally extending radial shoulder of the tail piece is less than the distance between the threaded portion of the swivel nut and the internally extending radial shoulder of the collar portion.

3. The coupling of claim 2 wherein the swivel nut has an external surface with flats thereon for gripping by a tool when turning the swivel nut to threadably engage an externally threaded element to be joined to the tail piece of the tube.

4. The coupling of claim 3 wherein the flats define a hexnut surface.

5. The coupling of claim 4 wherein the swivel nut is made of steel.

6. The coupling of claim 5 wherein the angle is about 20 degrees.

7. The coupling of claim 1 wherein the angle is about 20°.

8. The coupling of claim 7 wherein the swivel nut is made of steel.

9. The coupling of claim 1 wherein the swivel nut is made of steel.

* * * * *